(12) United States Patent
Rosenfelder et al.

(10) Patent No.: US 10,659,186 B2
(45) Date of Patent: *May 19, 2020

(54) MULTIPLEXING TWO SEPARATE OPTICAL LINKS WITH THE SAME WAVELENGTH USING ASYMMETRIC COMBINING AND SPLITTING

(71) Applicant: Corning Optical Communications LLC, Charlotte, NC (US)

(72) Inventors: Pinhas Yehuda Rosenfelder, Beit-Shemesh (IL); Carmi Shapira, D.N. Modiin (IL)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,796

(22) Filed: Nov. 19, 2018

(65) Prior Publication Data
US 2019/0140764 A1    May 9, 2019

Related U.S. Application Data

(63) Continuation of application No. 15/655,228, filed on Jul. 20, 2017, now Pat. No. 10,135,561, which is a continuation of application No. 14/962,279, filed on Dec. 8, 2015, now Pat. No. 9,729,267.

(60) Provisional application No. 62/090,658, filed on Dec. 11, 2014.

(51) Int. Cl.
*H04J 14/02*   (2006.01)
*H04B 10/2507* (2013.01)
*H04B 10/25*   (2013.01)

(52) U.S. Cl.
CPC ...... *H04J 14/0282* (2013.01); *H04B 10/2503* (2013.01); *H04B 10/2507* (2013.01); *H04J 14/0204* (2013.01); *H04J 14/0205* (2013.01); *H04J 14/0256* (2013.01); *H04J 14/0279* (2013.01)

(58) Field of Classification Search
None
See application file for complete search history.

(56) References Cited

U.S. PATENT DOCUMENTS

| 4,943,136 A | * | 7/1990 | Popoff | G02B 6/2804 385/46 |
| 5,500,763 A | * | 3/1996 | Ota | H04B 10/2972 359/333 |
| 6,031,645 A | * | 2/2000 | Ichikawa | H04B 10/2503 398/139 |

(Continued)

FOREIGN PATENT DOCUMENTS

WO    WO 02/18995    *    3/2002    ............ G02B 6/12

*Primary Examiner* — Li Liu
(74) *Attorney, Agent, or Firm* — C. Keith Montgomery

(57) ABSTRACT

An optical communications system includes an optical transmitter and an optical receiver optically coupled to an optical combiner/splitter, the combiner/splitter coupled to optical media; and, another optical transmitter and another optical receiver optically coupled to another optical combiner/splitter, the another combiner/splitter remotely coupled to the optical media; wherein the optical transmitter and the another optical transmitter are configured to transmit optical signals at substantially the same wavelength.

14 Claims, 3 Drawing Sheets

(56) References Cited

U.S. PATENT DOCUMENTS

| | | | |
|---|---|---|---|
| 6,211,978 B1* | 4/2001 | Wojtunik | H04B 10/2503 385/24 |
| 6,236,784 B1* | 5/2001 | Ido | G02B 6/125 385/39 |
| 8,699,881 B1 | 4/2014 | Iannone et al. | |
| 9,258,052 B2 | 2/2016 | George et al. | |
| 2004/0033076 A1 | 2/2004 | Song et al. | |
| 2008/0089692 A1* | 4/2008 | Sorin | H04J 14/02 398/135 |
| 2008/0089699 A1* | 4/2008 | Li | H04B 10/07957 398/197 |
| 2011/0013904 A1 | 1/2011 | Khermosh et al. | |
| 2011/0274433 A1* | 11/2011 | Presi | H04B 10/25759 398/97 |
| 2013/0343765 A1* | 12/2013 | Rohde | H04B 10/27 398/139 |

* cited by examiner

MULTIPLEXING TWO SEPARATE OPTICAL LINKS WITH THE SAME WAVELENGTH USING ASYMMETRIC COMBINING AND SPLITTING

PRIORITY APPLICATIONS

This application is a continuation of U.S. application Ser. No. 15/655,228, filed Jul. 20, 2017, which is a continuation of U.S. application Ser. No. 14/962,279, filed on Dec. 8, 2015 and issued as U.S. Pat. No. 9,729,267, which claims the benefit of priority to U.S. Provisional Application No. 62/090,658, filed on Dec. 11, 2014, the contents which are relied upon and incorporated herein by reference in their entireties.

BACKGROUND

Technical Field

Embodiments disclosed herein relate to communications within an optical network, and in particular, to methods and apparatus for multiplexing data signals.

Description of the Related Art

With the exponential growth in communications, there is a continuing demand for increased capacity. Generally, expanding capacity of fiber optic systems has been achieved by installing more cables; increasing system bitrate; and by wavelength division multiplexing.

Wavelength division multiplexing (WDM) uses existing electronics and fibers, and simply shares fibers by transmitting different channels at different wavelengths. Generally, a wavelength division multiplexing (WDM) system uses a multiplexer at the transmitter to join optical signals together and a demultiplexer at the receiver to split them apart. Most wavelength division multiplexing (WDM) systems operate on single-mode fiber optical cables, which have a core diameter of 9 μm. One type of wavelength division multiplexing (WDM) system is referred to as a "coarse wavelength division multiplexing (CWDM)" system. Generally, coarse wavelength division multiplexing (CWDM) systems provide up to eight (8) or nine (9) communications channels. Coarse wavelength division multiplexing (CWDM) uses increased channel spacing (spacing between wavelength groupings) to permit use of less sophisticated transceiver equipment.

Unfortunately, with the ever increasing demand for bandwidth, this is not adequate. As cable installation is a laborious and costly process, it is desirable to increase signal transmission using existing infrastructure. Thus, what are needed are methods and apparatus to increase signal transmission over existing implementations of fiber optics.

SUMMARY

In one embodiment, an optical communications system is provided. The system includes an optical transmitter and an optical receiver optically coupled to an optical combiner/splitter, the combiner/splitter coupled to optical media; and, another optical transmitter and another optical receiver optically coupled to another optical combiner/splitter, the another combiner/splitter remotely coupled to the optical media; wherein the optical transmitter and the another optical transmitter are configured to transmit optical signals at substantially the same wavelength.

At least one of the combiner/splitter and the another combiner/splitter may include an asymmetric combiner/splitter. The asymmetric combiner/splitter may include a high transmittance ratio, $T_R$, and a low transmittance ratio, $T_R$. The high transmittance ratio, $T_R$, and the low transmittance ratio, $T_R$, may have a combination of ratios that is one of 95/5, 90/10, 85/15, 80/20, 75/25, 70/30 and a ratio therebetween. At least one of the optical transmitter and the another optical transmitter is substantially insensitive to optical interference received at the operational wavelength. The optical media may include a single-mode optical fiber. A low transmittance ratio, $T_R$, may be associated with each of the optical transmitters. A high transmittance ratio, $T_R$, may be associated with each of the optical receivers.

In another embodiment, a method for providing an optical network configured for bi-directional communication using optical signals is provided. The method includes: selecting a first operator that includes an optical transmitter and an optical receiver optically coupled to an asymmetric optical combiner/splitter, the combiner/splitter and coupling the first operator to a first end of optical media; and, selecting another operator that includes another optical transmitter and another optical receiver optically coupled to another asymmetric optical combiner/splitter, the another operator remotely coupled to the optical media.

The method may further call for selecting the another optical transmitter for operation at substantially the same wavelength as the optical transmitter. The method may further call for associating a low transmittance ratio, $T_R$, of each of the combiner/splitters with a respective one of the optical transmitters. The method may further call for associating a high transmittance ratio, $T_R$, of each of the combiner/splitters with a respective one of the optical receivers. The method may further call for selecting a Fabry-Perot laser as at least one of the optical transmitters.

In another embodiment, an optical network is provided. The network includes an optical fiber; a first plurality of optical transmitters and receivers at a first end of the optical fiber, each optical transmitter and receiver configured to transmit and receive an optical link; a first optical line terminal at a first end of the optical fiber, the first optical line terminal configured to combine or split two optical links of the same wavelength on the same media; a second plurality of optical transmitters and receivers at a second end of the optical link, each optical transmitter and receiver configured to transmit and receive an optical link; a second optical line terminal at a second end of the optical fiber, the second optical line terminal configured to combine or split two optical links of the same wavelength on the same media; a first course wide division multiplex (CWDM) terminal, the first CWDM connected at a first end to the first plurality of optical transmitters and receivers and the first optical line terminal and at a second end to the optical fiber, the first CWDM configured to route optical links bi-directionally between the first plurality of optical transmitters and receivers and the first optical line terminal and the second plurality of optical transmitters and receivers; a second course wide division multiplex (CWDM) terminal, the second CWDM connected at a first end to the second plurality of optical transmitters and receivers and the second optical line terminal and at a second end to the optical fiber, the second CWDM configured to route optical links bi-directionally between the second plurality of optical transmitters and receivers and the second optical line terminal and the first plurality of optical transmitters and receivers.

Each of the first optical line terminal and the second optical line terminal may exhibit a high transmittance ratio, $T_R$, and a low transmittance ratio. The high transmittance ratio, $T_R$, and the low transmittance ratio, $T_R$, may include a combination of ratios that is one of 95/5, 90/10, 85/15, 80/20, 75/25, 70/30 and a ratio therebetween. A combination of the high transmittance ratio, $T_R$, and the low transmittance ratio, $T_R$, may be about 90/10. At least one of the first plurality of optical transmitters and at least one of the second plurality of optical transmitters may be substantially insensitive to optical interference received at the operational wavelength. The optical fiber may be a single-mode optical fiber. The low transmittance ratio, $T_R$, may be associated with each of the optical transmitters. The high transmittance ratio, $T_R$, may be associated with each of the optical receivers.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Disclosed herein are techniques for communicating data with a single band of wavelengths using two separate optical links over a single fiber. The techniques for "same wavelength multiplexing" make use of asymmetrical combining and splitting of the single band of wavelengths. Advantageously, the techniques provide for substantially increased communication capacity over an existing fiber optic system. Prior to discussing the invention in detail, some aspects are introduced.

As discussed herein, the term "wavelength" generally relates to a group of wavelengths used for communicating an optical signal. That is, it is not required that the optical signal be communicated at precisely one wavelength, but that the optical signal is communicated in a group of wavelengths that may be functionally considered as being associated with the optical signal. More specifically, each "wavelength" may actually include a distribution wavelengths. The distribution may be centered around the identified wavelength, or the identified wavelength may simply be within the grouping of wavelengths.

As discussed herein, the term "channel," "optical link," and other similar terms generally refer to a single data stream that is communicated over communications equipment.

Figure 1:
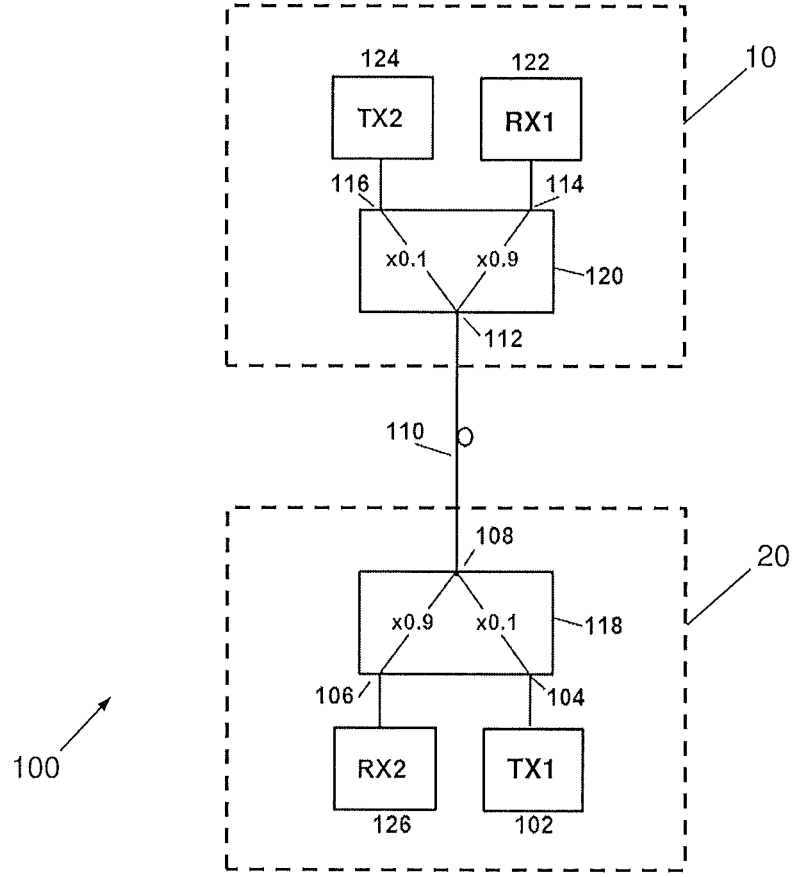
FIG. 1 is an schematic diagram depicting elements of a communications system for same wavelength signaling.

Referring now to FIG. 1, there are shown aspects of an exemplary embodiment of a communications system 100. The communication system 100 provides for the delivery of two (2) communications channels using common communications equipment.

In this embodiment, a first operator 10 communicates with a second operator 20 over optical media 110. Exemplary optical media 110 includes a single mode optical fiber. The first operator 10 includes equipment that is substantially similar or identical to the equipment maintained by the second operator 20. Alternatively, the equipment of the first operator 10 and second operator 20 may be different. Of course, each of the first operator 10 and the second operator 20 may maintain substantially more equipment than shown here. That is, the equipment shown and described is limited to that which provides for communications according to the teachings herein. Additional equipment and components may be included as desired, but will not be discussed further herein.

More specifically, the first operator 10 includes an optical receiver 122 for a first channel (RX1) and an optical transmitter 124 for a second channel (TX2). The optical receiver 122 and the optical transmitter 124 are optically coupled to a combiner/splitter 120. The optical receiver 122 is optically coupled to the combiner/splitter 120 at receiver port 114. The optical transmitter 124 is optically coupled to the combiner/splitter 120 at transmitter port 116. The combiner/splitter 120 is optically coupled to the optical media 110 at fiber port 112.

Similarly, the second operator 20 includes an optical receiver 126 for the second channel (RX2) and an optical transmitter 102 for the first channel (TX1). The optical receiver 126 and the optical transmitter 102 are optically coupled to a combiner/splitter 118. The optical receiver 126 is optically coupled to the combiner/splitter 118 at receiver port 106. The optical transmitter 102 is optically coupled to the combiner/splitter 120 at transmitter port 104. The combiner/splitter 118 is optically coupled to the optical media 110 at fiber port 108.

It should be noted that the use of "RX" and "TX" nomenclature herein (in particular, with regards to FIGS. 1 and 2) generally refer to aspects of communications for a given channel. That is, RX refers to receiving a signal, while TX refers to transmitting a signal. The following Arabic number refers to the specific channel (channel 1, channel 2, and so on).

Each of the combiner/splitters 118, 120 is asymmetric. For example, in the embodiment shown, for the first operator 10, the combiner/splitter 120 has a transmittance ratio, $T_R$, of ×0.9 from the fiber port 112 to the receiver port 114. The combiner/splitter 120 has a transmittance ratio, $T_R$, of ×0.1 from the transmitter port 116 to the fiber port 112. In this exemplary embodiment, the isolation level between the transmitter port 116 and the receiver port 114 is about 60 dB. In the exemplary embodiment, the transmittance ratios, $T_R$, provide adequate attenuation between the optical transmitters 124, 102 while transmitting adequate energy to respective optical receiver 126, 122.

By appropriately configuring the communication system 100, it is possible to provide for communications where a first signal does not substantially interfere with a second signal. For example, consider a first signal generated for the first channel (TX1). The first signal is generated by the optical transmitter 102. The first signal generated by the optical transmitter 102 will be attenuated when transmitted from the respective transmit port 104 of the combiner/splitter 118 to the fiber port 108. When transmitted through the combiner/splitter 118, the first signal will be attenuated by a low transmittance ratio, $T_R$, (in this case, $T_R$=0.1). When the first signal is received by the opposing combiner/splitter 120, the first signal will be split. A first portion of the first signal will be transmitted from fiber port 112 to the receiver port 114 and on to optical receiver 122, and will be further attenuated by a second, higher, transmittance ratio, $T_R$, (in this case, $T_R$=0.9). Accordingly, the optical energy transmitted by the optical transmitter 102 and reaching the respective optical receiver 122 will be: Energy*(0.1*0.9), or 0.09*Energy.

Similarly, a second portion of the first signal transmitted from fiber port 112 to the receiver port 116 and on to optical transmitter 124 will be further attenuated by a second, lower, transmittance ratio, $T_R$, (in this case, $T_R$=0.1). Accordingly, optical energy transmitted by the optical transmitter 102 and received at the opposing optical transmitter 124 (for TX2) will be: Energy*(0.1*0.1), or 0.01*Energy.

In general, each of the combiner/splitters 118, 120 includes an asymmetric set of transmittance ratios, $T_R$. The asymmetric set of transmittance ratios, $T_R$, includes a low coefficient and a high coefficient.

In the same example, a second signal is generated for the second channel (TX2) by the opposing optical transmitter 124. The second signal generated by the optical transmitter 124 will be attenuated by a low transmittance ratio, $T_R$, (in this case, $T_R$=0.1) when transmitted from the respective transmit port 116 of the combiner/splitter 120 to the fiber port 112. When the second signal is received by the opposing combiner/splitter 118, the second signal will be split. A first portion of the second signal transmitted from fiber port 108 to the receiver port 106 and on to optical receiver 126 will be further attenuated by a second, higher, transmittance ratio, $T_R$, (in this case, $T_R$=0.9). Accordingly, the optical energy transmitted by the optical transmitter and reaching the respective optical receiver 126 will be: Energy*(0.1*0.9), or 0.09*Energy.

Similarly, a second portion of the second signal transmitted from fiber port 108 to the receiver port 104 and on to optical transmitter 102 will be further attenuated by a second, lower, transmittance ratio, $T_R$, (in this case, $T_R$=0.1). Accordingly, optical energy transmitted by the optical transmitter 124 and received at the opposing optical transmitter 102 (for TX1) will be: Energy*(0.1*0.1), or 0.01*Energy.

In other words, by appropriately configuring the pair of combiners/splitters 118, 120, a respective optical receiver 122 will receive adequate optical energy to provide for signal discrimination. At the same time, with an appropriate type of optical transmitter, the opposing optical transmitter 124 does not receive signal energy that is substantial enough to cause interference with optical transmission.

Exemplary components for use as the optical transmitter 102, 124 include Fabry Perot lasers.

In view of the above, bi-directional communications over a single fiber with opposing optical signals that are centered around a single wavelength are achievable.

Selection of appropriate combiner/splitter components may include consideration of length of the optical media 110 (that is, a degree of attenuation within the optical media 110), power of the respective optical transmitters, types of optical transmitters, sensitivity of optical receivers, cost, availability and other such factors.

Figure 2:
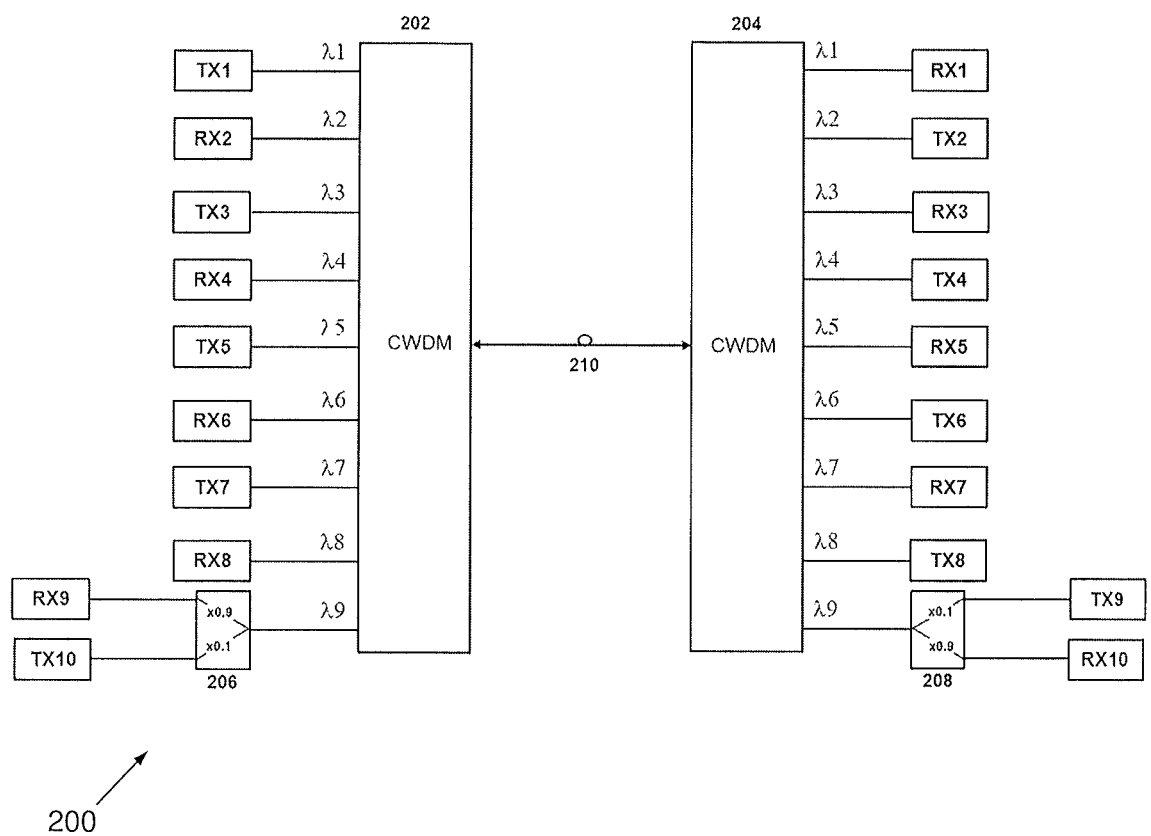
FIG. 2 is schematic diagram depicting elements of the communications system of FIG. 1 integrated into a coarse wavelength division multiplexing (CWDM) system.

FIG. 2 illustrates aspects of an exemplary embodiment of an optical network 200 that makes use of the teachings herein. Optical network 200 includes an optical fiber 210; a first plurality of optical transmitters and receivers (TX1, RX2, TX3, RX4, TX5, RX6, TX7, RX8, RX9, TX10) at a first end of the optical fiber 210, each optical transmitter and receiver is configured to transmit and receive an optical link (respectively). A second plurality of optical transmitters and receivers (RX1, TX2, RX3, TX4, RX5, TX6, RX7, TX8, TX9, RX10) are provided at a second end of the optical fiber 210, each optical transmitter and receiver configured to transmit and receive an optical link (respectively).

Optical network 200 further includes a first course wide division multiplex (CWDM) terminal 202. The first CWDM terminal 202 is connected at a first end to the first plurality of optical transmitters and receivers. The first CWDM terminal 202 is configured to route optical links bi-directionally between the first plurality of optical transmitters and receivers and the optical fiber 210. The second CWDM terminal 204 is connected to the second plurality of optical transmitters and receivers and the optical fiber 210. The second CWDM terminal 204 is configured to route optical links bi-directionally between the second plurality of optical transmitters and receivers and the optical fiber 210.

In the exemplary embodiment, the optical network 200 is configured to operate with ten communications channels (TX/RX1, TX/RX2, ... TX/RX10). The optical network 200 makes use of nine separate wavelengths ($\lambda 1, \lambda 2, \ldots \lambda 9$). Communications channels TX/RX9 and TX/RX10 make use of a single wavelength, $\lambda 9$.

In this exemplary embodiment, the first coarse wavelength division multiplexing (CWDM) terminal 202 is configured with equipment as may be known in the art for generating, transmitting and receiving optical signals in an optical communications system. Similarly, the second coarse wavelength division multiplexing (CWDM) terminal 204 is configured with equipment as may be known in the art for generating, transmitting and receiving optical signals in an optical communications system.

The first coarse wavelength division multiplexing (CWDM) terminal 202 is also configured with combiner/splitter 206 which is configured to provide for communicating data with a single band of wavelengths ($\lambda 9$) using two separate optical links (TX/RX9 and TX/RX10) over optical fiber 210. The second coarse wavelength division multiplexing (CWDM) terminal 204 is also configured with combiner/splitter 208 which is configured to provide for communicating data with a single band of wavelengths ($\lambda 9$) using two separate optical links (TX/RX9 and TX/RX10) over the optical fiber 210.

Figure 3:
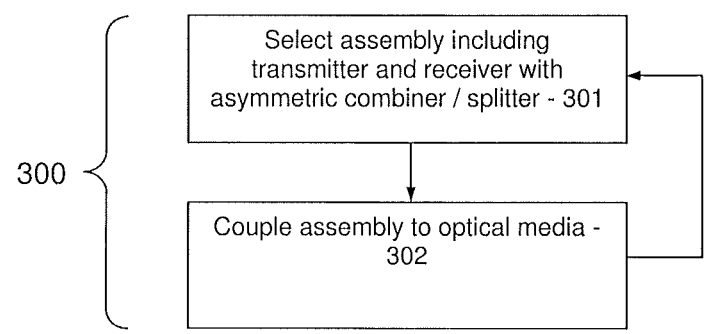
FIG. 3 is a flow chart depicting an exemplary method according to this disclosure.

FIG. 3 depicts an exemplary method for assembling an optical network according to the teachings herein. In the exemplary method for optical network assembly 300, a first step 301 calls for selecting an assembly that includes an optical transmitter, an optical receiver and a combiner/splitter. In a second step 302, the assembly is coupled to optical media, such as an optical fiber. The first step 301 and the second step 302 may be repeated as many times as needed to complete the optical network.

Having set forth exemplary embodiments, some additional aspects are now introduced.

The teachings herein may be applied in any type of optical communication system and/or architecture deemed appropriate. For example, in some other embodiments of a coarse wavelength division multiplexing (CWDM) system, at least some of the other wavelengths ($\lambda 1, \lambda 2, \ldots \lambda 8$) are used for "same wavelength multiplexing" techniques as provided for with regard to FIG. 5.

The optical transmitter may include any device deemed appropriate. Generally, optical transmitters are selected for insensitivity to low levels of optical interference at the operational wavelength of the optical transmitter. That is, in general, each optical transmitter is substantially insensitive to wavelengths received from the opposing optical transmitter (as a result of attenuation by the two combiner/splitter elements in combination with the properties of the optical transmitter). In some embodiments, the optical transmitter includes a Fabry Perot laser. In some other embodiments, the optical transmitter includes a discrete coaxial packaged laser, a small form pluggable (SFP) transceivers, a small form pluggable plus (SFP+) transceivers (if using FP) and other such devices.

The optical receiver may include any device deemed appropriate. Generally, optical receivers are selected for sensitivity to low levels of optical signals at the operational wavelength. In some embodiments, the optical receiver includes any one of a discrete coaxial packaged photodiode, a SFP transceivers, a SFP+ transceivers any other similar device.

Wavelengths may be centered around any wavelength deemed appropriate. For example, wavelengths may be centered about groupings used by conventional optical systems. More specifically, wavelengths selected for use in a communications channel may be centered about any one of 1270, 1310, 1350, 1400, 1480, 1550, and 1630 nm.

Optical combiners/splitters may employ any distribution of transmittance ratios, $T_R$, deemed appropriate. For example, the transmittance ratios, $T_R$, may include high/low combinations such as: 95/5, 90/10, 85/15, 80/20, 75/25, 70/30 and ratios there between.

Other optical devices may be included. For example, a variety of optical couplings and associated components may be included.

The combiner/splitter units selected may operate on any principle deemed appropriate. For example, in some embodiments, the combiner/splitter using polarizing technology. Attenuators, absorbers, reflectors, birefringent elements and other such components may be included within the combiner/splitter (or elsewhere) within the communications system.

The optical media may include a continuous fiber, an optical network, or any other optical system deemed appropriate. It is not required that the optical media be a single, continuous fiber. For example, in some embodiments, at least another splitter may be incorporated. That is, in some embodiments, one combiner/splitter is coupled to one end of the optical media, while an opposing combiner/splitter is coupled to an opposing end of the optical media. In some other embodiments, such as where intermediate couplings, other devices and/or multiple operators are used, one combiner/splitter is coupled to the optical media, while another combiner/splitter is remotely coupled to the optical media.

One set of wavelengths is substantially the same as another set of wavelengths if systems using the wavelengths are functionally adequate in performance.

Various other components may be included and called upon for providing for aspects of the teachings herein. Standards of performance are to be judged by a system designer, manufacturer, user or other similarly interested party. The term "substantial" as used herein generally relates to adequacy of resulting system performance.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical communications system comprising:
   a first optical transmitter and a first optical receiver optically coupled to a first asymmetric optical combiner/splitter, the first asymmetric optical combiner/splitter coupled to optical media; and
   a second optical transmitter and a second optical receiver optically coupled to a second asymmetric optical combiner/splitter, the second asymmetric optical combiner/splitter remotely coupled to the optical media, wherein:
   the first asymmetric optical combiner/splitter is configured to attenuate a first signal transmitted from the first optical transmitter based on a low transmittance ratio assigned to the first optical transmitter prior to providing the first signal to the optical media;
   the second asymmetric optical combiner/splitter is configured to attenuate the first signal received from the optical media based on a high transmittance ratio assigned to the first optical receiver prior to providing the first signal to the first optical receiver;
   the second asymmetric optical combiner/splitter is configured to attenuate a second signal transmitted from the second optical transmitter based on the low transmittance ratio assigned to the second optical transmitter prior to providing the second signal to the optical media; and
   the first asymmetric optical combiner/splitter is configured to attenuate the second signal received from the optical media based on the high transmittance ratio assigned to the second optical receiver prior to providing the second signal to the second optical receiver; wherein
   the first asymmetric optical combiner/splitter is configured to attenuate the second signal prior to providing the second signal to the second optical receiver, and
   the first optical transmitter and the second optical transmitter are configured to transmit optical signals at substantially a same wavelength, and wherein the optical media comprises at least one optical fiber.

2. The optical communications system of claim 1, wherein the high transmittance ratio and the low transmittance ratio comprise a combination of ratios that is one of 95/5, 90/10, 85/15, 80/20, 75/25, 70/30, and a ratio therebetween.

3. The optical communications system of claim 2, wherein at least one of the first optical transmitter and the second optical transmitter is substantially insensitive to optical interference received at an operational wavelength.

4. The optical communications system of claim 1, wherein the high transmittance ratio and the low transmittance ratio comprise a combination of ratios that is about 90/10.

5. The optical communications system of claim 1, wherein the high transmittance ratio and the low transmittance ratio comprise a combination of ratios that is one of 95/5, 90/10, 85/15, 80/20, 75/25, 70/30, and a ratio therebetween.

6. The optical communications system of claim 1, wherein the high transmittance ratio and the low transmittance ratio comprise a combination of ratios that is about 90/10.

7. The optical communications system of claim 6, wherein at least one of the first optical transmitter and the second optical transmitter is substantially insensitive to optical interference received at an operational wavelength.

8. The optical communications system of claim 7, wherein the low transmittance ratio is associated with each of the first and second optical transmitters.

9. The optical communications system of claim 8, wherein the high transmittance ratio is associated with each of the first and second optical receivers.

10. The optical communications system of claim 1, wherein the high transmittance ratio and the low transmittance ratio comprise a combination of ratios that is one of 95/5, 90/10, 85/15, 80/20, 75/25, 70/30, and a ratio therebetween.

11. The optical communications system of claim 1, wherein the high transmittance ratio and the low transmittance ratio comprise a combination of ratios that is about 90/10.

12. The optical communications system of claim 11, wherein at least one of the first optical transmitter and the second optical transmitter is substantially insensitive to optical interference received at an operational wavelength.

13. The optical communications system of claim 12, wherein the low transmittance ratio is associated with each of the first and second optical transmitters.

14. The optical communications system of claim 13, wherein the high transmittance ratio is associated with each of the first and second optical receivers.

* * * * *